United States Patent
Dearborn et al.

(10) Patent No.: US 9,660,535 B2
(45) Date of Patent: May 23, 2017

(54) METHOD AND SYSTEM TO DYNAMICALLY POSITION A SWITCH MODE POWER SUPPLY OUTPUT VOLTAGE

(71) Applicant: Microchip Technology Incorporated, Chandler, AZ (US)

(72) Inventors: Scott Dearborn, Brackney, PA (US); Terry Cleveland, Endicott, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 185 days.

(21) Appl. No.: 13/671,953

(22) Filed: Nov. 8, 2012

(65) Prior Publication Data

US 2013/0119875 A1   May 16, 2013

Related U.S. Application Data

(60) Provisional application No. 61/558,616, filed on Nov. 11, 2011.

(51) Int. Cl.
  *H02M 3/335*   (2006.01)
  *H05B 37/00*   (2006.01)
  *H05B 33/08*   (2006.01)

(52) U.S. Cl.
  CPC ........ *H02M 3/335* (2013.01); *H05B 33/0815* (2013.01); *H05B 37/00* (2013.01); *Y02B 20/346* (2013.01); *Y02B 20/347* (2013.01)

(58) Field of Classification Search
  CPC ........... H05M 2003/1566; H02M 3/18; H02M 3/335; H05B 37/00; H05B 37/02;
  (Continued)

(56) References Cited

U.S. PATENT DOCUMENTS 5,568,016 A * 10/1996 Beard .................. 315/169.3
6,594,161 B2   7/2003 Jansen et al. ............ 363/21.14
(Continued)

FOREIGN PATENT DOCUMENTS

CN    1685596 A    10/2005  ............ H02M 3/335
CN  101155448 A     4/2008  ............ H05B 33/08
(Continued)

OTHER PUBLICATIONS

Linear Technology 'LTC3806 'Synchronous Flyback DC/DC Controller', 2004.*
(Continued)

Primary Examiner — Jimmy Vu
Assistant Examiner — Henry Luong
(74) Attorney, Agent, or Firm — Slayden Grubert Beard PLLC

(57) ABSTRACT

A switch mode power supply (SMPS) converter is periodically run backwards by using a synchronous switch instead of the normally used commutating diode. By running the SMPS converter backwards the SMPS output capacitor can be discharged very quickly to provide a fast turn off of (no current through) the LED's, thereby solving the color shift problem. This enables positioning the output voltage of the SMPS up or down by actively charging or discharging the bulk output capacitor. Having the capability of actively charging or discharging the bulk output capacitor allows generation of a current source comprising substantially square, e.g., substantially full current when on and substantially no current when off, current pulses that are preferable for driving LED lighting applications.

17 Claims, 9 Drawing Sheets

(58) Field of Classification Search
CPC ............ H05B 33/0815; H05B 33/0833; H05B 33/0845; Y02B 20/144; Y02B 20/346
USPC ....... 315/186, 141, 212, 219, 282, 323, 345, 315/351, 353
See application file for complete search history.

(56) References Cited

U.S. PATENT DOCUMENTS

| | | | |
|---|---|---|---|
| 6,671,189 B2 | 12/2003 | Jansen et al. ............... | 363/21.14 |
| 6,788,555 B2 | 9/2004 | Giannopoulos et al. ... | 363/21.14 |
| 7,902,771 B2 | 3/2011 | Shteynberg et al. ......... | 315/307 |
| 8,023,291 B2 | 9/2011 | Sato ........................... | 363/21.14 |
| 8,067,898 B2 | 11/2011 | Radermacher et al. ...... | 315/291 |
| 8,952,632 B2 | 2/2015 | Du et al. ...................... | 315/308 |
| 9,035,566 B2* | 5/2015 | Du .................... | H05B 33/0818 315/291 |
| 2003/0086280 A1* | 5/2003 | Bourdillon ................ | 363/21.12 |
| 2005/0007086 A1* | 1/2005 | Morimoto ..................... | 323/282 |
| 2005/0122747 A1 | 6/2005 | Gaksch ........................... | 363/24 |
| 2005/0152158 A1 | 7/2005 | Gut et al. .......................... | 363/16 |
| 2005/0194952 A1* | 9/2005 | Carpenter et al. ............ | 323/283 |
| 2005/0213352 A1 | 9/2005 | Lys et al. .......................... | 363/17 |
| 2006/0018135 A1 | 1/2006 | Yang et al. ................. | 363/21.14 |
| 2006/0170373 A1* | 8/2006 | Yang .................. | H05B 33/0815 315/209 R |
| 2007/0096704 A1* | 5/2007 | Jain et al. ..................... | 323/282 |
| 2007/0159151 A1* | 7/2007 | Katoh et al. ................. | 323/285 |
| 2007/0257647 A1* | 11/2007 | Chen et al. .................. | 323/282 |
| 2008/0018261 A1* | 1/2008 | Kastner ......................... | 315/192 |
| 2008/0088248 A1* | 4/2008 | Myers .................. | H02M 3/335 315/210 |
| 2008/0180078 A1* | 7/2008 | Hiasa ........................... | 323/282 |
| 2008/0224636 A1* | 9/2008 | Melanson ...................... | 315/307 |
| 2008/0225563 A1* | 9/2008 | Seo ................................ | 363/123 |
| 2009/0296425 A1 | 12/2009 | Lhermite .................... | 363/21.04 |
| 2010/0110732 A1* | 5/2010 | Moyer et al. ..................... | 363/19 |
| 2010/0283322 A1 | 11/2010 | Wibben .......................... | 307/31 |
| 2010/0301761 A1* | 12/2010 | Liao et al. .................... | 315/186 |
| 2010/0308733 A1 | 12/2010 | Shao .............................. | 315/119 |
| 2010/0315840 A1 | 12/2010 | Cohen ........................ | 363/21.04 |
| 2011/0057960 A1 | 3/2011 | Kim et al. .................... | 345/690 |
| 2011/0193481 A1* | 8/2011 | Nakamura ......... | H05B 41/2882 315/82 |
| 2012/0025722 A1* | 2/2012 | Mokry ............... | H05B 33/0827 315/187 |

FOREIGN PATENT DOCUMENTS

| | | | |
|---|---|---|---|
| CN | 201115609 Y | 9/2008 | ............. A47J 27/21 |
| CN | 101523982 A | 9/2009 | ............. H05B 33/08 |
| CN | 101582636 A | 11/2009 | ............. G01R 19/00 |
| CN | 101848577 A | 9/2010 | ............. H05B 37/02 |
| EP | 1538734 A2 | 6/2005 | ............. H02M 3/335 |
| EP | 2296439 A1 | 3/2011 | ............. H05B 33/08 |
| GB | 2435406 A | 8/2007 | ............. A47J 27/21 |
| TW | 571497 B | 1/2004 | ............. H02M 3/28 |
| TW | 200838358 A | 9/2008 | ............. H05B 37/02 |
| WO | 2004/015850 A1 | 2/2004 | ............. H02M 3/335 |
| WO | 2007/055519 A1 | 5/2007 | ............... H03K 7/08 |

OTHER PUBLICATIONS

Cypress Semiconductor, 'PowerPSoC Intelligent LED Driver', Sep. 17, 2009.*
International Search Report and Written Opinion, Application No. PCT/US2013/062193, 11 pages, Jun. 2, 2014.
International Search Report and Written Opinion, Application No. PCT/US2012/064447, 13 pages, Oct. 14, 2013.
United States Final Office Action, U.S. Appl. No. 14/038,199, 26 pages, Jun. 2, 2016.
European Office Action, Application No. 12808540.4, 7 pages, Aug. 1, 2016.
Taiwan Office Action, Application No. 101141908, 9 pages, Jan. 19, 2016.
Chinese Office Action, Application No. 201280066405.4, 8 pages, Jan. 28, 2016.
United States Non-Final Office Action, U.S. Appl. No. 14/038,199, 24 pages, Nov. 9, 2015.
Chinese Office Action, Application No. 201280066405.4, 18 pages, Oct. 9, 2016.
Chinese Office Action, Application No. 201380051181.4, 8 pages, Nov. 2, 2016.
United States Non-Final Office Action, U.S. Appl. No. 14/038,199, 13 pages, Nov. 3, 2016.
Taiwan Office Action, Application No. 102135168, 5 pages, Dec. 22, 2016.
Chinese Office Action, Application No. 201280066405.4, 8 pages, Mar. 20, 2017.

* cited by examiner

METHOD AND SYSTEM TO DYNAMICALLY POSITION A SWITCH MODE POWER SUPPLY OUTPUT VOLTAGE

RELATED PATENT APPLICATION

This application claims priority to commonly owned U.S. Provisional Patent Application Ser. No. 61/558,616; filed Nov. 11, 2011; entitled "Method and System to Dynamically Position a Switch Mode Power Supply Output Voltage," by Scott Dearborn and Terry Cleveland; which is hereby incorporated by reference herein for all purposes.

TECHNICAL FIELD

The present disclosure relates to switch mode power supplies, and in particular, a switch mode power supply to power and control dimming of light emitting diodes (LEDs).

BACKGROUND

When driving light emitting diodes (LED's), for example, in automotive headlight applications, a dimming switch can be used to turn the LED current ON and OFF very quickly. Without using the dimming switch the output capacitor of a switch mode power supply (SMPS) provides enough energy for the LED current to decay slowly as one would expect. This slow decay causes a wavelength shift in the LED light. This shift is noticeable because the light color changes.

SUMMARY

Therefore there exists a need for an improved switch mode power supply (SMPS) that can power and control dimming of light emitting diodes (LEDs) without causing noticeable output light color changes.

According to an embodiment, a power supply circuit may comprise: a pulse width modulation controller coupled with a flyback circuit, wherein the flyback circuit comprises a primary circuit controlled by a first field effect transistor and a secondary circuit controlled by a second field effect transistor and comprising an output capacitor, wherein the controller may be configured to control the second field effect transistor such that the output capacitor may be discharged to eliminate a tail current of an output pulse. According to a further embodiment, the power supply circuit provides power for at least one light emitting diode string.

According to another embodiment, a method for dynamically positioning a switch mode power supply output voltage may comprise the steps of: charging an output capacitor through a flyback transformer with a main switch, wherein the flyback transformer and the main switch may be coupled to a power source; and discharging the output capacitor through the flyback transformer with a sync switch, wherein the flyback transformer and the sync switch may be coupled to the output capacitor; wherein the main switch and the sync switch may be controlled by a switch mode power supply controller, whereby the steps of charging and discharging the output capacitor provide a substantially square wave pulse width modulated current to a load coupled to the output capacitor.

According to a further embodiment of the method, the load may be a series connected string of light emitting diodes. According to a further embodiment of the method, the string of light emitting diodes have high output light and may be used for automotive applications. According to a further embodiment of the method, the main switch and the sync switch may be power field effect transistors. According to a further embodiment of the method, the switch mode power supply controller may be a microcontroller.

According to a further embodiment of the method, the load may comprise a first string of light emitting diodes operating at a first voltage and a second string of light emitting diodes operating at a second voltage, wherein the first voltage may be greater than the second voltage, and may further comprise the steps of: disconnecting the second string of light emitting diodes with a disconnect/connect switch when a voltage on the charged output capacitor may be at substantially the first voltage; and connecting the second string of light emitting diodes with the disconnect/connect switch when a voltage on the charged output capacitor may be at substantially the second voltage.

According to a further embodiment of the method, the output capacitor may be discharged through the flyback transformer into an input capacitor. According to a further embodiment of the method, the output capacitor may be coupled to a secondary winding of the flyback transformer and the input capacitor may be coupled to a primary winding of the flyback transformer.

According to still another embodiment, a system for dynamically positioning a switch mode power supply output voltage may comprise: a flyback transformer having a primary winding and a secondary winding; a main switch coupled in series with the primary winding of the flyback transformer, wherein the primary winding of the flyback transformer and the main switch may be coupled to a power source; a sync switch coupled in series with the secondary of the flyback transformer; and an output capacitor coupled to the secondary of the flyback transformer and the sync switch; wherein the main switch charges the output capacitor through the flyback transformer, and sync switch discharges the output capacitor back through flyback transformer; and a switch mode power supply controller coupled to and controlling the main switch and the sync switch; wherein a substantially square wave pulse width modulated current may be provided to a load coupled to the output capacitor.

According to a further embodiment, the load may be a series connected string of light emitting diodes. According to a further embodiment, the string of light emitting diodes may have high output light and may be used for automotive applications. According to a further embodiment, the main switch and the sync switch may be power field effect transistors. According to a further embodiment, the switch mode power supply controller may be a microcontroller. According to a further embodiment, the load may comprise a first string of light emitting diodes operating at a first voltage and a second string of light emitting diodes operating at a second voltage, wherein the first voltage may be greater than the second voltage; wherein the second string of light emitting diodes may be disconnected from the output capacitor with a disconnect/connect switch when a voltage on the output capacitor may be at substantially the first voltage; and the second string of light emitting diodes may be connected with the disconnect/connect switch when the voltage on the output capacitor may be at substantially the second voltage. According to a further embodiment, the output capacitor may be discharged through the flyback transformer into an input capacitor coupled to the primary winding of the flyback transformer.

BRIEF DESCRIPTION OF THE DRAWINGS

A more complete understanding of the present disclosure may be acquired by referring to the following description taken in conjunction with the accompanying drawings wherein.

Figure 1:
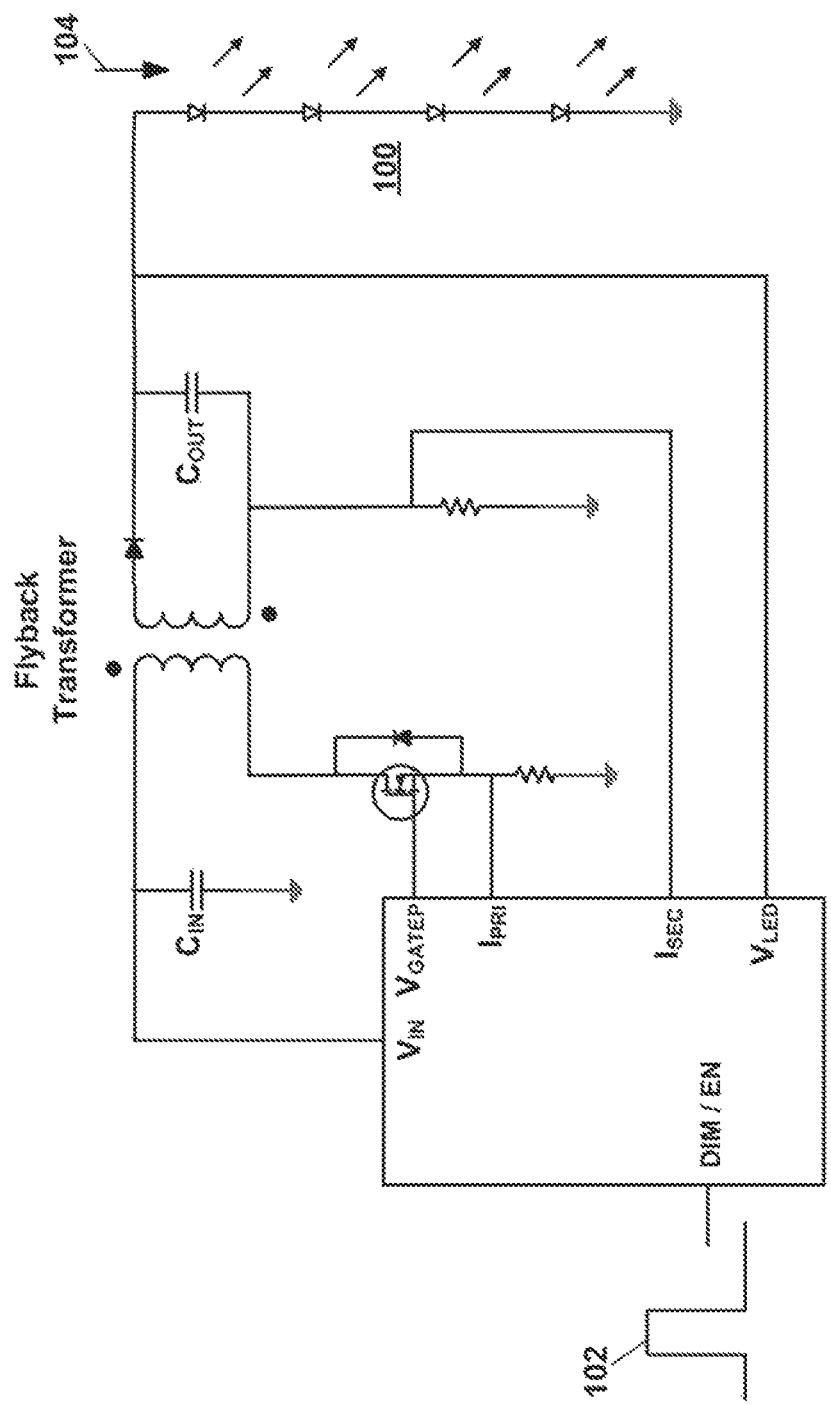
FIG. 1 illustrates a schematic diagram of a typical conventional SMPS using flyback topology.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A microcontroller unit (MCU) may be defined as a host microcontroller or programmable logic having non-volatile program memory. According to various embodiments, a method and system are proposed to basically run a switch mode power supply (SMPS) converter backwards by using a synchronous switch instead of the normally used commutating diode. By running the converter backwards the SMPS output capacitor can be discharged very quickly to provide a fast turn off of (no current through) the LED's, thereby solving the color shift problem. This enables positioning the output voltage of the SMPS up or down by actively charging or discharging the bulk output capacitor. Having the capability of actively charging or discharging the bulk output capacitor allows generation of a current source comprising substantially square, e.g., substantially full current when on and substantially no current when off, current pulses that are preferable for driving LED lighting applications.

According to the teachings of this disclosure, an output voltage from a SMPS is dynamically controlled for driving a series connected string of power LEDs at a substantially constant current. This improves the dynamic response of the current pulse to the LEDs while dimming the LEDs, and improves the rise and fall times of LED current critical in many LED lighting applications. It also prevents color shift and improves dimming range (narrow and wide pulses perform substantially the same). Therefore, no dimming switch is necessary. No timing circuits are required that need calibration. Thereby simplifying dimming solutions for LED drive applications by removing the requirement for dimming switches and eliminating variability in timing circuits. Furthermore, the requirement for factory calibration is eliminated and current transient response is substantially improved, thereby resulting in less color shift of the light from the LEDs. The duty cycle range may also be increased for various LED dimming applications, according to various embodiments described herein.

Referring now to the drawing, the details of a specific example embodiment is schematically illustrated. Like elements in the drawings will be represented by like numbers, and similar elements will be represented by like numbers with a different lower case letter suffix.

Referring to FIG. 1, depicted is a schematic diagram of a typical conventional SMPS using flyback topology. An enable input, EN, turns on and off the output of the SMPS for dimming of the LEDs 100. By varying the duty cycle of the dimming control pulses 102, the length of time that current 104 flows through the LEDs 100 may thereby be used to control the light output therefrom. The amount of current 104 through an LED 100 will affect the color of the light (e.g., color temperature) produced therefrom.

Figure 2:
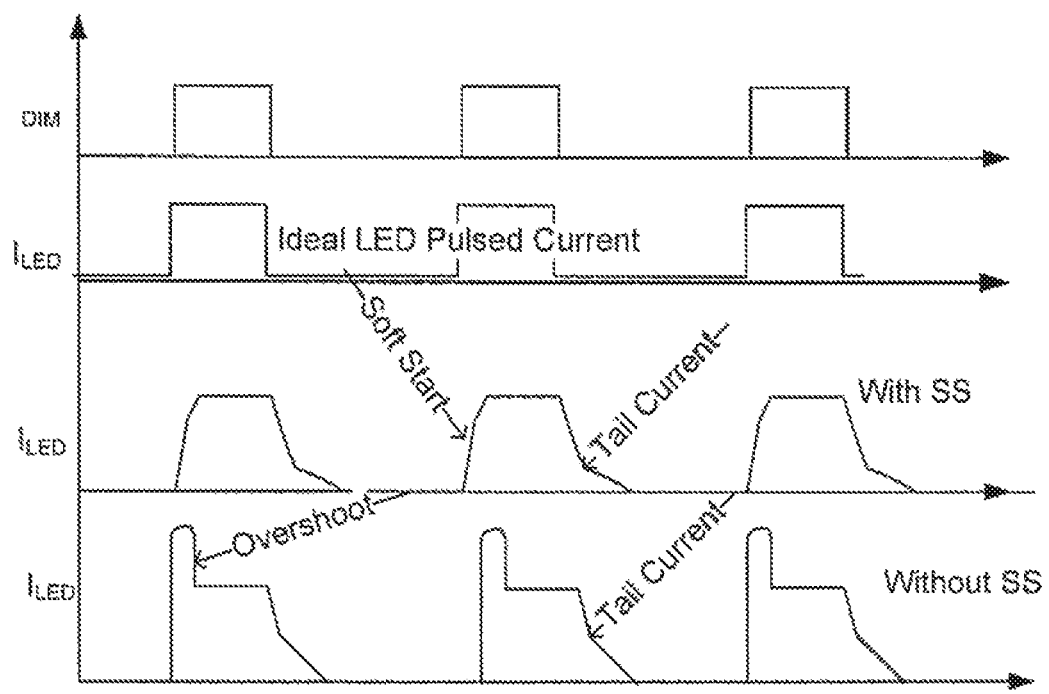
FIG. 2 illustrates schematic timing diagrams of an ideal pulsed current of the SMPS circuit shown in FIG. 1 which has soft start, tail current and overshoot issues.

Referring to FIG. 2, depicted are schematic timing diagrams of an ideal pulsed current of the SMPS circuit shown in FIG. 1 which has soft start, tail current and overshoot issues. The DIM pulse 102 is used to turn on and off the output of the SMPS. An ideal LED current, $I_{LED}$ 104a, waveform would alternate between full desired current and no current. However, the SMPS creates a voltage output that causes the current, $I_{LED}$ 104, to flow through the series connected string of LEDs 100. For the SMPS circuit shown in FIG. 1, the output voltage cannot be turned on and off instantaneously because of the charging and discharging time constants of the bulk output capacitor, $C_{OUT}$, and circuit impedance (not shown) associated therewith. There will be a delay in a desired maximum LED current, $I_{LED}$ 104b, when a soft start function is used in the SMPS, and an overshoot in the desired maximum LED current, $I_{LED}$ 104c, when a soft start is not used. Residual voltage on the bulk output capacitor, $C_{OUT}$, will cause a tail current for either LED current, $I_{LED}$ 104b or $I_{LED}$ 104c. These undesirable current deviations from will cause color shifts in the light output produced from what color would have been produced by the ideal LED current, $I_{LED}$ 104a.

Figure 3:
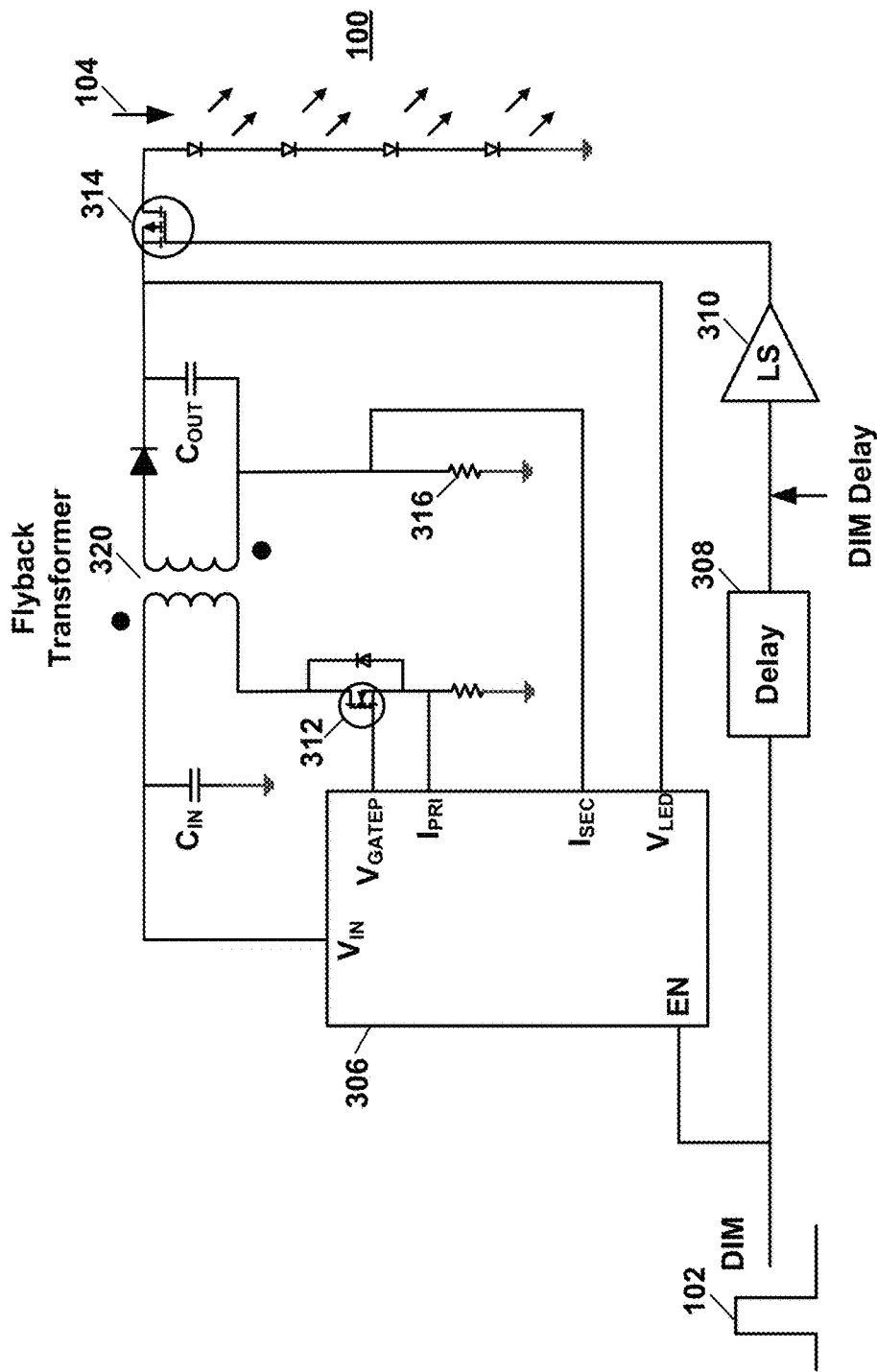
FIG. 3 illustrates a schematic diagram of a SMPS having improved functionality by adding a dimming switch and a delay for turning on the dimming switch.
Figure 4:
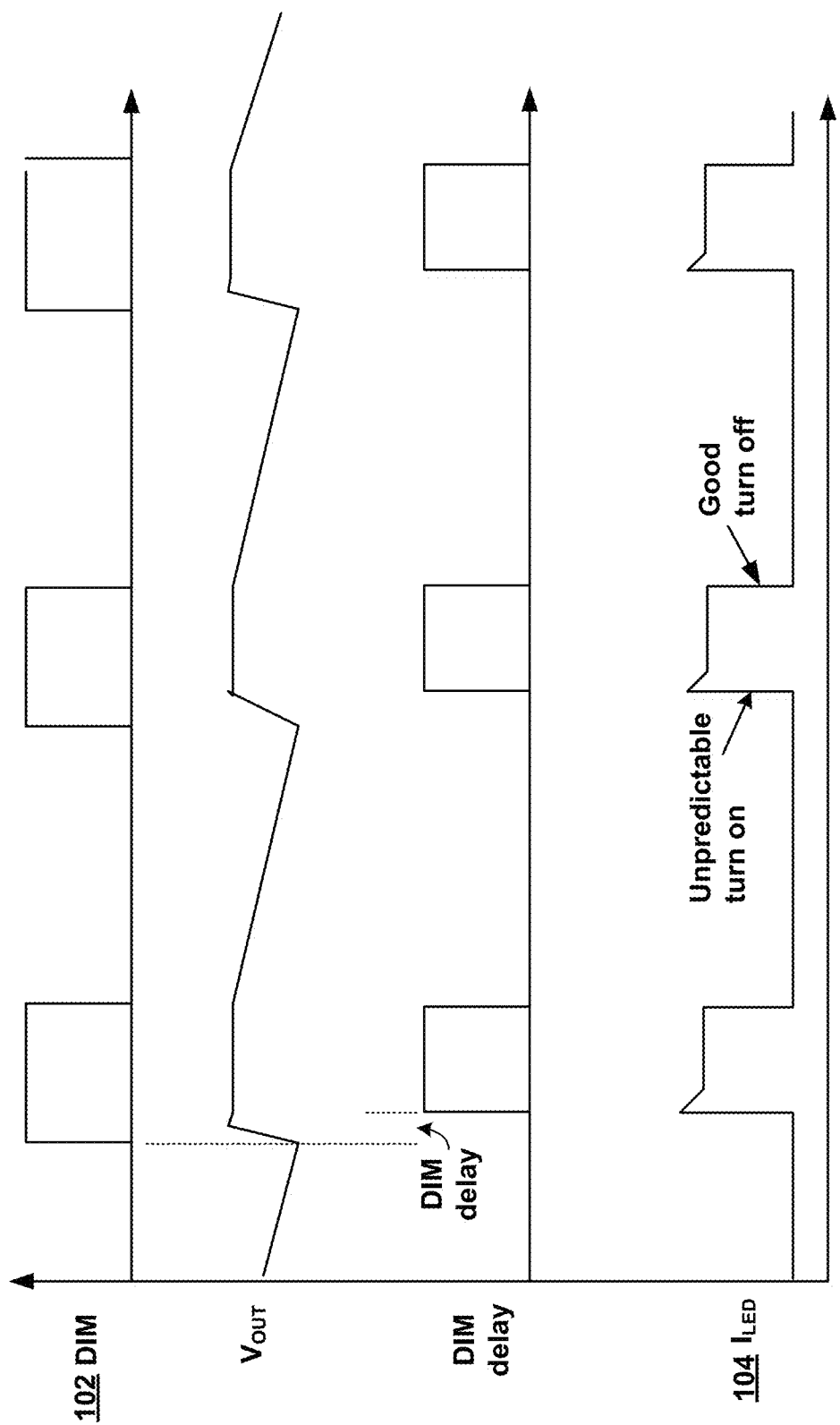
FIG. 4 illustrates schematic timing diagrams of the SMPS circuit shown in FIG. 3 which has an overshoot issue.

Referring to FIGS. 3 and 4, depicted is a schematic diagram of a SMPS having improved functionality by adding a dimming switch and a delay for turning on the dimming switch (FIG. 3), and schematic timing diagrams thereof (FIG. 4). A dimming switch 314 is connected in series between the output of the SMPS and the LEDs 100. A delay circuit 308 is provided for turning on the dimming switch 314 through a voltage level shifter 310. The SMPS in combination with the dimming switch 314 and delay circuit 308 provides for good turn off of the current to the LED 100, but has a rather unpredictable turn-on functionality as shown in FIG. 4. Hence, overshoot problems can occur using the SMPS circuit shown in FIG. 3. A current measurement resistor 316 is used to measure the current through the LEDs 100. The output capacitor, $C_{OUT}$, is charged through the diode connected to the flyback transformer 320, that is excited by the main switch 312.

Figure 5:
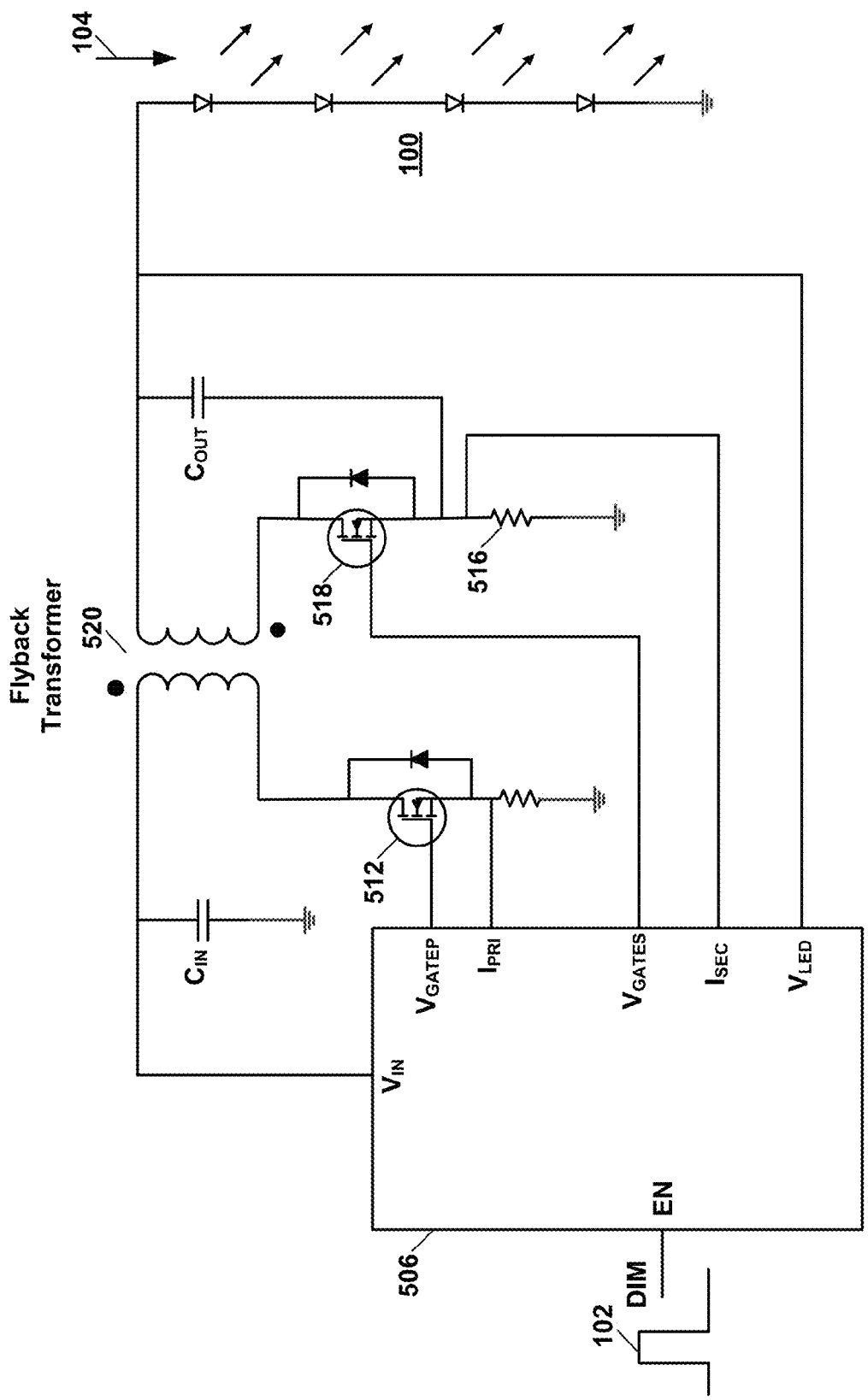
FIG. 5 illustrates a schematic diagram of a SMPS for driving light emitting diodes (LEDs), according to a specific example embodiment of this disclosure.
Figure 6:
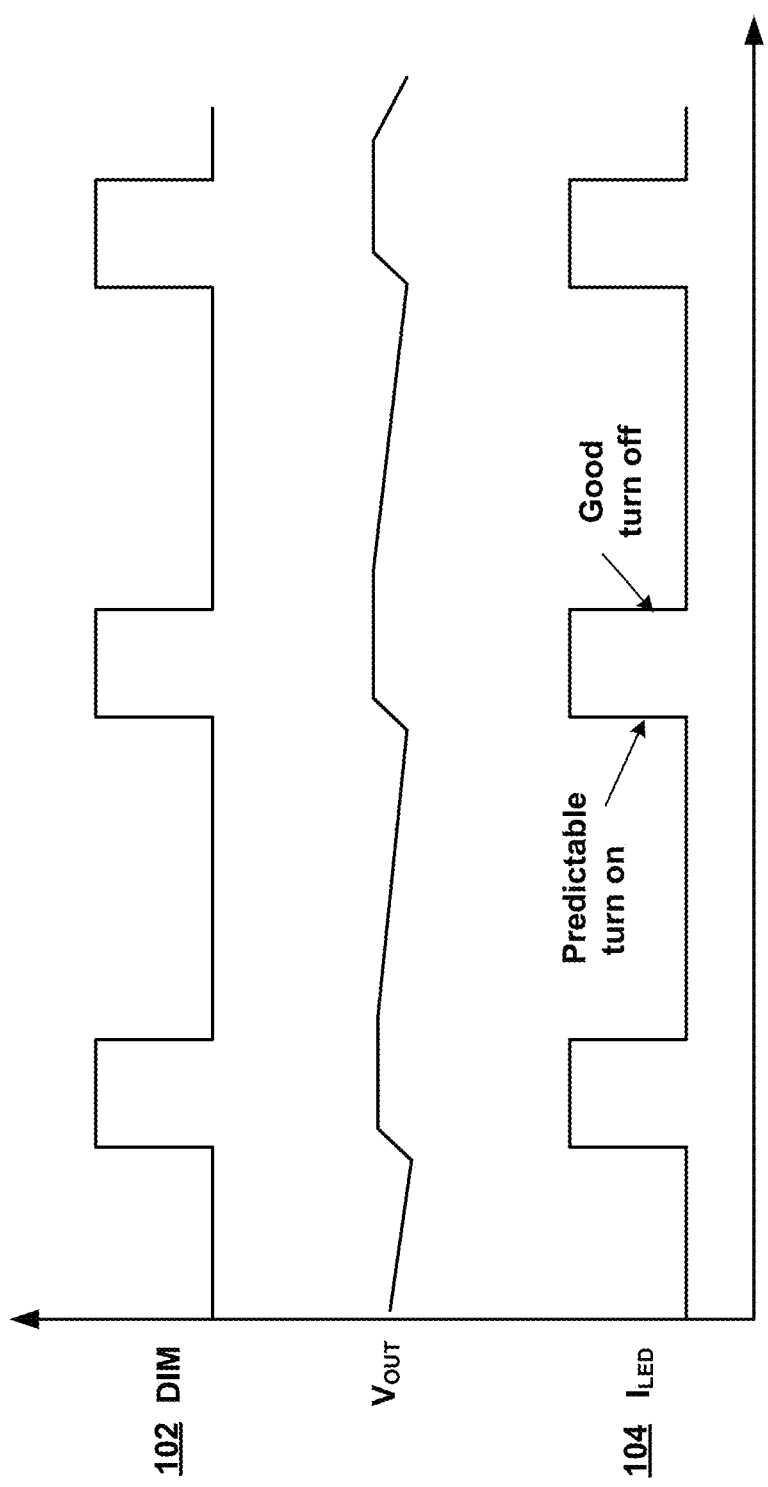
FIG. 6 illustrates a schematic timing diagrams of the SMPS circuit shown in FIG. 5.

Referring to FIGS. 5 and 6, depicted is a schematic diagram of a SMPS for driving light emitting diodes (LEDs) (FIG. 5) and schematic timing diagrams thereof (FIG. 6), according to a specific example embodiment of this disclosure. The secondary output diode driving the bulk output capacitor, $C_{OUT}$, has bee replaced with a synchronous switch 518. This synchronous switch 518 enables bi-directional control of the energy stored in the bulk output capacitor, $C_{OUT}$, and may be used to quickly discharge the bulk output capacitor, $C_{OUT}$, thereby eliminating tail current and LED color change. A current measurement resistor 516 is used to measure the current through the LEDs 100. The output capacitor, $C_{OUT}$, is charged through the flyback transformer 520, that is excited by the main switch 512. The circuit shown in FIG. 5 improves efficiency over a SMPS using an output diode, especially for low voltage high current LED's. It is contemplated and within the scope of this disclosure that the circuit shown in FIG. 5 may be applied to many SMPS topologies.

The LED current 104 may be regulated using an error amplifier, comparator and latch (not shown). Another input to the latch may be used to terminate the PWM current pulse (LED current 104) asynchronously. A second comparator and programmable Vref (not shown) may be used to ripple regulate the SMPS output voltage. When using a synchronous SMPS, the output voltage can be driven up or down. To drive the output voltage up, the main switch 512 is used and the converter operates normally in a "forward" mode. To rapidly position the output voltage down, the synch switch 518 discharges the bulk output capacitor, $C_{OUT}$, back into the input capacitor, $C_{IN}$, thereby returning energy thereto. This provides quick positioning of the SMPS output voltage which has been the problem driving LEDs with non-synch SMPS topologies. Once the voltage has been positioned, the current loop (not shown) is connected to develop a desired "square" wave pulsed current 104 into the LED string 100. It is contemplated and within the scope of this disclose that a mixed signal (analog and digital) microcontroller 506 may be used, and one having ordinary skill in SMPS and microcontroller design, and the benefit of this disclosure could easily replication the functionality of the synchronous SMPS shown in FIG. 5. The switches 512 and 518 may be power field effect transistors (FETs).

Figure 7:
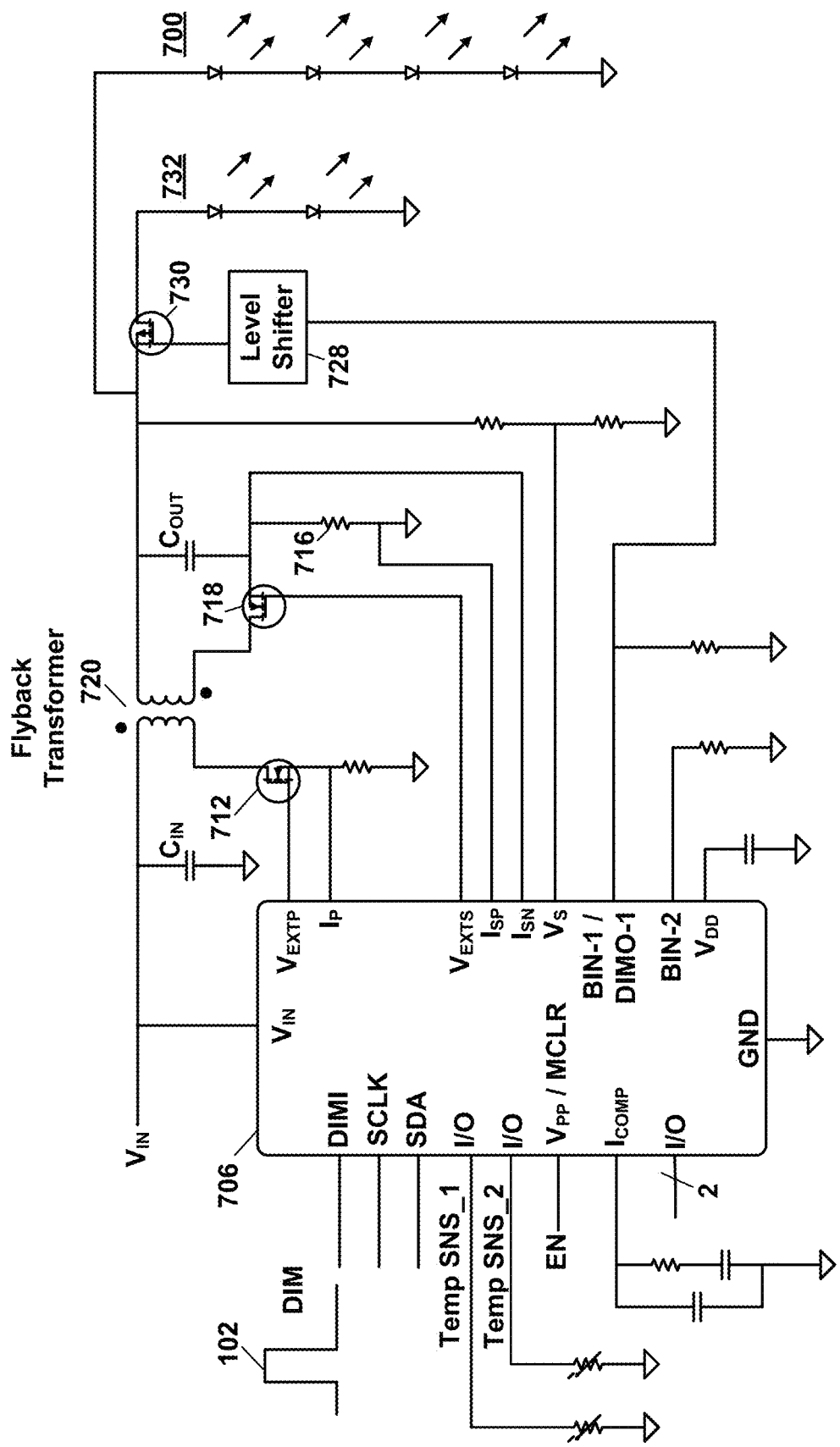
FIG. 7 illustrates a schematic diagram of a SMPS for driving two strings of light emitting diodes (LEDs), according to another specific example embodiment of this disclosure.

Referring to FIG. 7, depicted is a schematic diagram of a SMPS for driving two strings of light emitting diodes (LEDs), according to another specific example embodiment of this disclosure. The SMPS shown in FIG. 7 may comprise a SMPS controller 706, e.g., microcontroller; a main (primary) switch 712, a synch switch 718, a flyback transformer 720, a low LED string switch 730, a voltage level shifter 728, an SMPS controller 706, a current measurement resistor 716, low beam LEDs 732 and high beam LEDs 700. The switches 712, 718 and 728 may be power field effect transistors (FETs).

The high beam LEDs 700 operate at a higher voltage than do the low beam LEDs 728. The SMPS controller 706 controls the output voltage from the SMPS. When high beam light from the LEDs 700 is desired, the low LED string switch 730 is off (open) and the SMPS provides an output voltage high enough to drive the high beam LEDs 700 to the desired current, $I_{LED}$ 104. When low beam light from the LEDs 732 is desired, the low LED string switch 730 is on (closed) and the SMPS provides an output voltage high enough to drive the low beam LEDs 732 to the desired current, $I_{LED}$ 104, but not high enough to cause the high beam LEDs 700 to conduct current. It is also contemplated and within the scope of this disclosure that the high and low beam LEDs 700 and 732, respectively, may be combined into one series connected string, wherein a tap (not shown) somewhere between the series connected LEDs is provided and coupled to the output of the low LED string switch 730.

Figure 8:
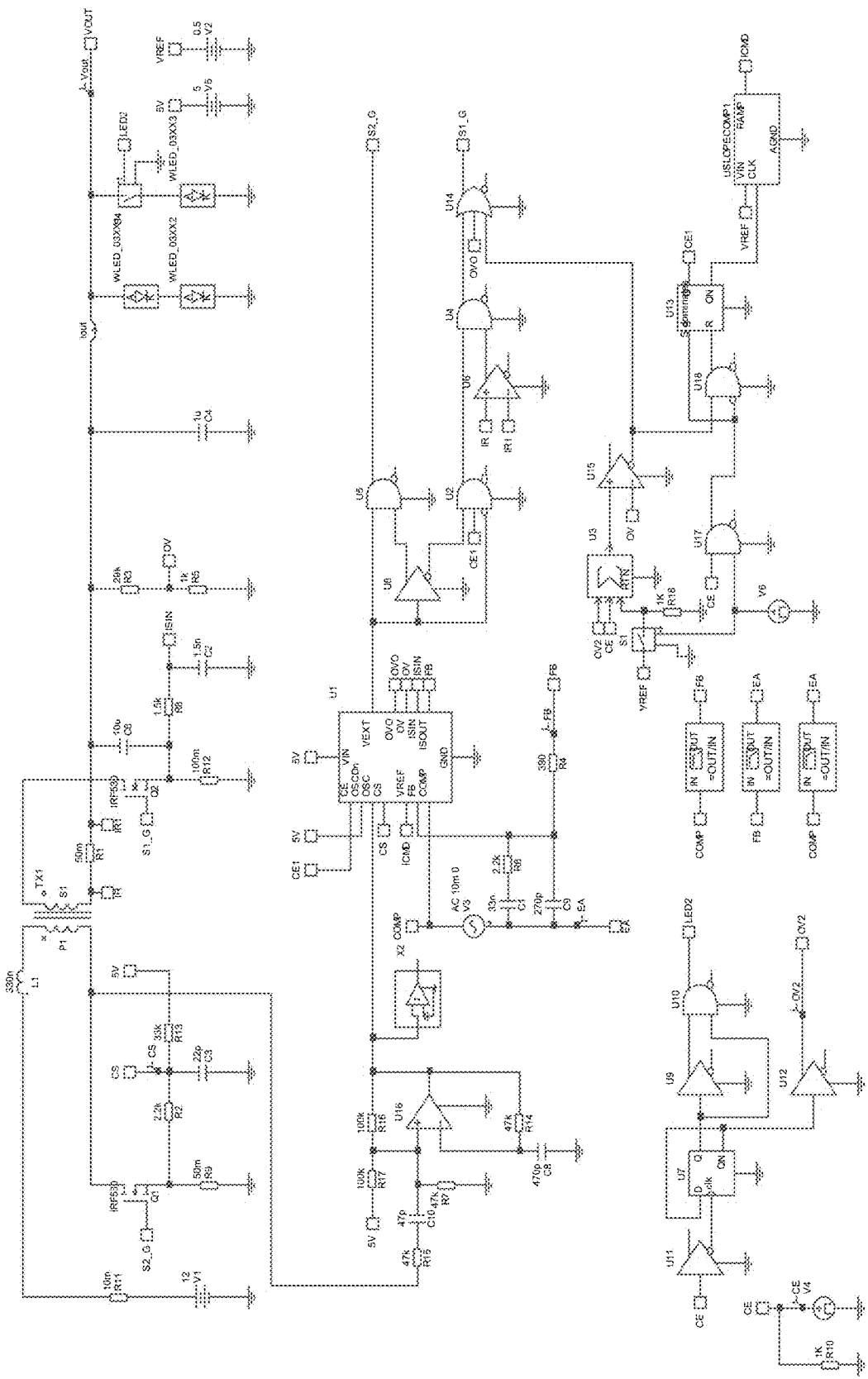
FIG. 8 illustrates a detailed schematic diagram of a simulated SMPS circuit for driving two strings of light emitting diodes (LEDs), according to the teachings of this disclosure.
Figure 9:
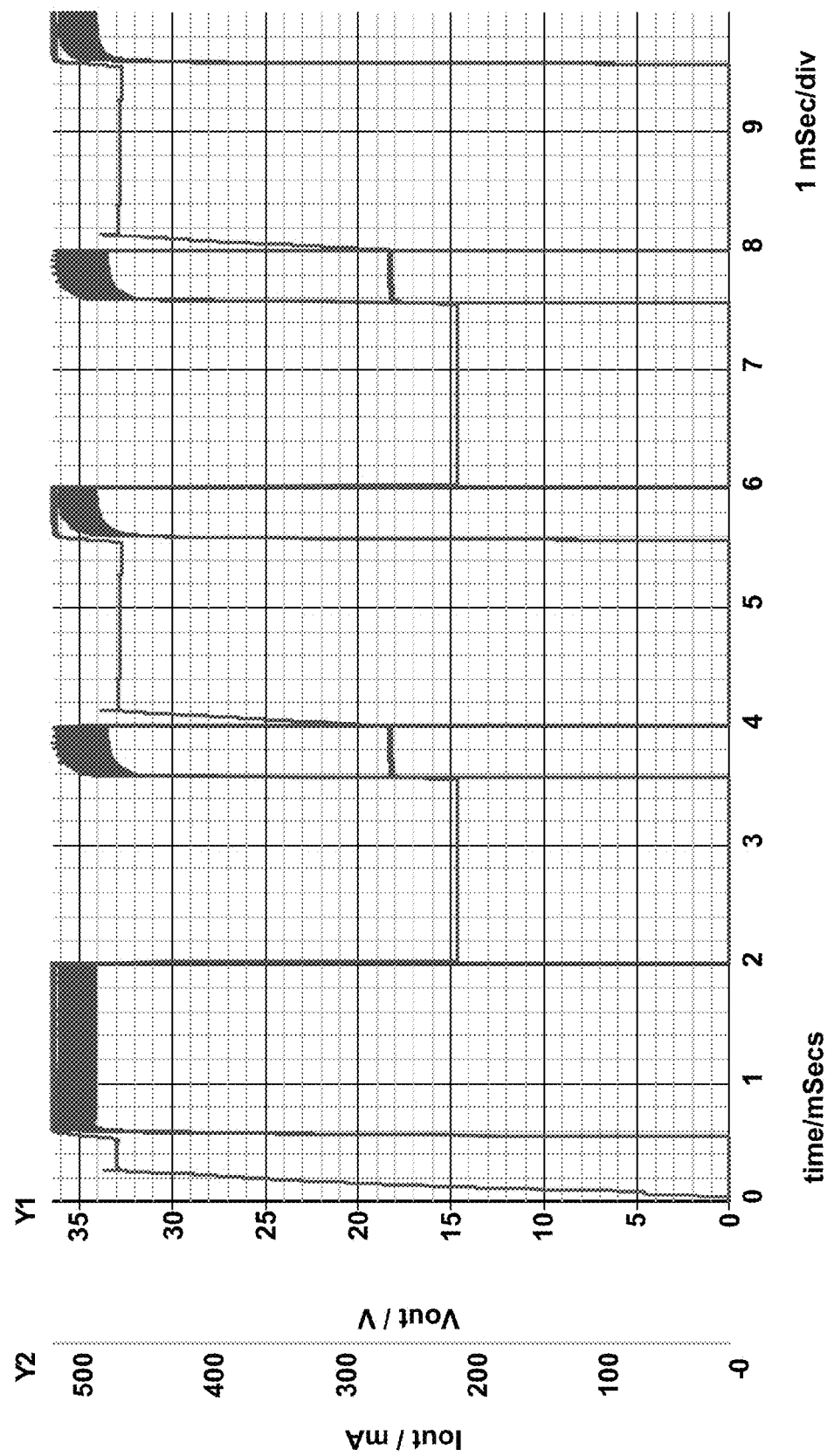
FIG. 9 illustrates schematic timing diagrams of the simulated SMPS circuit shown in FIG. 8.

Referring to FIGS. 8 and 9, depicted is a detailed schematic diagram of a simulated SMPS circuit for driving two strings of light emitting diodes (LEDs) (FIG. 8) and schematic timing diagrams thereof (FIG. 9), according to the teachings of this disclosure. A microcontroller, glue logic and voltage level shifters may be used as the SMPS controller and coupled to the appropriate power switches (power FETs).

The various embodiments described hereinabove can be implemented into, for example but not limited to, an automotive light input LED driver, or integrated circuit microcontrollers with drivers for LED string(s). An integrated circuit microcontroller can be capable of controlling drive signals for at least one LED string. An internal to the microcontroller digital-to-analog converter (DAC) may be used for setting current regulation and/or may also be used for setting hysteretic voltage regulation.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A power supply circuit, comprising:
a pulse width modulation controller coupled with a flyback circuit, wherein the flyback circuit comprises a primary circuit comprising a primary winding of a flyback transformer connected in series with a first field effect transistor controlled by the pulse width modulation controller and a secondary circuit comprising a second field effect transistor connected in series with an output capacitor wherein the series connected second field effect transistor and output capacitor are connected in parallel with a secondary winding of the flyback transformer, wherein the pulse width modulation controller controls the first field effect transistor and the second field effect transistor synchronously to said first field effect transistor to generate a desired output voltage through the flyback transformer, wherein the pulse width modulation controller further comprises an input receiving a dimming control signal and wherein a load is coupled with the output capacitor and a load current is regulated using an error amplifier, comparator and a latch, wherein another input of the latch is used to terminate a pulse width modulated current pulse through said load asynchronously to generate a square wave pulse current, and
a shunt resistor coupled between ground and a node of the series connected second field effect transistor and the output capacitor, wherein a voltage across the shunt resistor is measured by the pulse width modulation controller.

2. The power supply circuit according to claim 1, wherein the power supply circuit provides power for at least one light emitting diode string.

3. The power supply circuit according to claim 1, wherein the pulse width modulation controller is further configured to measure an output voltage at the output capacitor.

4. A method for dynamically positioning a switch mode power supply output voltage, said method comprising the steps of:
charging an output capacitor through a flyback transformer with a main switch, wherein a primary side of the flyback transformer and the main switch are coupled to a power source;

discharging the output capacitor through a secondary side of the flyback transformer with a secondary switch operated synchronously, wherein the secondary side of the flyback transformer, the secondary switch and the output capacitor are coupled in series to form a closed circuit loop; and measuring a load current through a shunt resistor coupled between ground and a node formed by the series connected secondary switch and the output capacitor;

wherein the main switch and the secondary switch are controlled by a switch mode power supply controller receiving a dimming control signal, whereby the steps of charging and discharging the output capacitor is accomplished by opening and closing the secondary switch, wherein charging and discharging of the output capacitor provide a substantially square wave pulse width modulated current to a load coupled to the output capacitor depending on the dimming control signal by regulating the load current using an error amplifier, comparator and a latch, wherein another input of the latch is used to terminate a pulse width modulated current pulse through said load asynchronously, wherein the output capacitor is discharged through a secondary winding of the flyback transformer thereby charging an input capacitor coupled with a primary winding of the flyback transformer.

5. The method according to claim 4, wherein the load is a series connected string of light emitting diodes.

6. The method according to claim 4, wherein the string of light emitting diodes have output light suitable for a high beam function in an automotive application.

7. The method according to claim 4, wherein the main switch and the secondary switch are power field effect transistors.

8. The method according to claim 4, wherein the switch mode power supply controller is a microcontroller.

9. The method according to claim 4, wherein the load comprises a first string of light emitting diodes operating at a first voltage and a second string of light emitting diodes operating at a second voltage, wherein the first voltage is greater than the second voltage, and further comprising the steps of:
 disconnecting the second string of light emitting diodes with a disconnect/connect switch when a voltage on the charged output capacitor is at substantially the first voltage; and
 connecting the second string of light emitting diodes with the disconnect/connect switch when a voltage on the charged output capacitor is at substantially the second voltage.

10. A system for dynamically positioning a switch mode power supply output voltage for a string of LEDs, said system comprising:
 a flyback transformer having a primary winding and a secondary winding;
 a main switch coupled in series with the primary winding of the flyback transformer, wherein the primary winding of the flyback transformer and the main switch are coupled to a power source;
 a secondary switch coupled in series with the secondary winding of the flyback transformer, wherein the secondary switch is a power field effect transistor;
 an output capacitor coupled in series with the secondary winding of the flyback transformer and the secondary switch such that output capacitor, secondary switch and secondary winding form a closed circuit loop and wherein the output capacitor is coupled with the string of LEDs; and
 a shunt resistor coupled between ground and a node of the series connected secondary switch and capacitor, wherein a voltage across the shunt resistor represents a load current;
 wherein the main switch charges the output capacitor through the secondary winding of the flyback transformer, and the secondary switch is controlled to discharge the output capacitor only through the secondary switch and the secondary winding of the flyback transformer when closed; and
 a switch mode power supply controller coupled to and controlling the main switch and the secondary switch, wherein the switch mode power supply controller comprises an input receiving a dimming control signal;
 wherein for dimming the string of LEDs, a substantially square wave pulse width modulated current is provided to the LEDs coupled with the output capacitor by regulating the load current using an error amplifier, comparator and a latch, wherein another input of the latch is used to terminate a pulse width modulated current pulse through said load asynchronously.

11. The system according to claim 10, wherein the string of light emitting diodes have output light suitable for a high beam function in an automotive application.

12. The system according to claim 10, wherein the main switch is a power field effect transistors.

13. The system according to claim 10, wherein the switch mode power supply controller is a microcontroller.

14. The system according to claim 13, wherein the voltage across the shunt resistor is measured by the microcontroller.

15. The system according to claim 14, wherein the microcontroller is further configured to measure an output voltage at the output capacitor.

16. The system according to claim 10, wherein the load comprises a first string of light emitting diodes operating at a first voltage and a second string of light emitting diodes operating at a second voltage, wherein the first voltage is greater than the second voltage;
 wherein
 the second string of light emitting diodes is disconnected from the output capacitor with a switch controlled by the switch mode power supply controller when a voltage on the output capacitor is at substantially the first voltage; and
 the second string of light emitting diodes is connected with the disconnect/connect switch when the voltage on the output capacitor is at substantially the second voltage.

17. The system according to claim 10, wherein the output capacitor is discharged through the flyback transformer into an input capacitor coupled to the primary winding of the flyback transformer by closing said secondary switch.

* * * * *